United States Patent Office 3,642,748
Patented Feb. 15, 1972

3,642,748
PROCESS FOR THE POLYMERIZATION OF OLEFINS
Koichiro Iwasaki, Kazuo Yamaguchi, and Genjiro Kakogawa, Tokyo, Yasuo Ohtsuka, Kawasaki-shi, and Kanji Kasahara, Tokyo, Japan, assignors to Mitsubishi Chemical Industries Limited, Tokyo, Japan
No Drawing. Filed Dec. 15, 1969, Ser. No. 885,271
Int. Cl. C08f 1/56, 3/06
U.S. Cl. 260—88.2                                         5 Claims

ABSTRACT OF THE DISCLOSURE

A process for polymerizing ethylene or a mixture of ethylene and other copolymerizable $\alpha$-olefins, wherein polymerization is carried out at 0–110° C. under atmospheric or superatmospheric pressure in the absence of a liquid hydrocarbon diluent, and in the presence of a catalyst which is a mixture of two portions of finely granular ethylene polymer impregnated with an organoaluminum compound of the general formula $AlR_{3-n}X_n$ wherein R is an alkyl group, X may be the same or different and is a halogen atom or an alkoxy or trialkylsiloxy group and $n$ is a number of 0–2, and a vanadium compound of the general formula $VOY_3$ wherein Y may be the same or different and is a halogen atom, an alkoxy or trialkylsiloxy group, with the proviso that at least one Y is an alkoxy group or trialkylsiloxy group.

---

This invention relates to a process for the polymerization of olefins. More particularly, this invention relates to a process for the production of olefin polymers possessing excellent crystallinity and narrow molecular weight distribution, wherein an improved catalyst is employed.

Widely known heretofore as catalysts for polymerization or copolymerization of olefins such as ethylene are so-called Ziegler catalysts which are two component catalysts. However, it can hardly be said, even in the case of using a typical Ziegler catalyst, i.e. a catalyst derived from a titanium halide and an alkylaluminum, that the resulting olefin polymers necessarily have satisfactory properties. Namely, ethylene polymers obtained by using such catalyst are only those having a density of 0.95–0.96 and broad molecular weight distribution.

Catalysts composed of vanadium compounds in combination with alkylaluminum compounds have been proposed heretofore to improve these defects. If the polymerization of ethylene is carried out using such catalysts, an extremely remarkable polymerization activity is exhibited in the presence of an inert hydrocarbon solvent and ethylene polymer of uniform molecular weight distribution is obtained. On the other hand, however, the catalyst life is short and the polymerization reaction proceeds so rapidly that control of the reaction temperature is difficult. Further, ethylene polymer obtained by using such catalysts is in very finely divided form and has an extremely low bulk density. Therefore, such catalysts are not industrially advantageous in respect of production.

After research in an effort to prepare an industrially advantageous catalyst for the polymerization of olefins which overcomes said drawbacks, the present inventors have found that the use as a catalyst of certain organoaluminum and vanadium compounds affords an extremely high polymerization activity and is effective, in the polymerization of ethylene by a specified process, for prolonging the catalyst life for a long period of time and obtaining a polymer in granular form having a high bulk density.

It is an object of this invention to provide an industrially advantageous process for the polymerization of ethylene wherein ethylene polymer having a density of at least 0.965, excellent crystallinity and uniform molecular weight distribution is obtained in granular form having a high bulk density. This object can easily be attained in accordance with this invention by polymerizing ethylene in vapor phase in the presence of a catalyst prepared by impregnating finely divided ethylene polymer separately with an organoaluminum compound and a vanadium compound of the general formula $VOY_3$ where Y which may be the same or different and represents a halogen atom, an alkoxy group or a trialkylsiloxy group, with the proviso that at least one of the Y's is an alkoxy or trialkylsiloxy group.

Below are more detailed explanations of this invention. Any organoaluminum compound having at least one carbon-aluminum bond can be used as one of the catalyst components of this invention. An alkylaluminum compound can be used of the general formula $AlR_{3-n}X_n$ wherein X may be the same or different and represents a halogen atom, an alkoxy group or a trialkylsiloxy group, R represents an alkyl group and $n$ is a number of 0–2. The alkylaluminum compound may be, for example, trialkylaluminum, dialkylaluminum monohalide, sesquialkylaluminum halide, monoalkylaluminum dihalide, dialkylaluminum monoalkoxide and mono(trialkylsiloxy)-dialkylaluminum, as the halogen, chlorine, bromine and iodine are usually employed.

As the other catalyst component, i.e. a vanadium compound of the general formula $VOY_3$ where Y may be the same or different and represents a halogen atom, an alkoxy group or a trialkylsiloxy group, with the proviso that at least one of Y's is an alkoxy or trialkylsiloxy group, a pentavalent vanadium compound is necessarily used as is evident from the above formula. Since such vanadium compound is used, as will be described hereinafter, to impregnate inert ethylene polymer therewith, one readily soluble into hydrocarbons is preferable. As vanadium compounds having a valence less than pentavalent are sparingly soluble into hydrocarbon solvents, it is impossible to impregnate inert ethylene polymer sufficiently with such compounds, thus making it difficult to perform the reaction completely.

Vanadium compounds represented by the above general formula include, for example, trialkoxyvanadyls such as trimethoxyvanadyl, triethoxyvanadyl, tripropoxyvanadyl, tributoxyvanadyl and triisobutoxyvanadyl; haloalkoxyvanadyls such as monochlorodiethoxyvanadyl, dichloromonoethoxyvanadyl, monochlorodipentoxyvanadyl, monochlorodibutoxyvanadyl and monochlorodiisobutoxyvanadyl; and tri(trialkylsiloxy)vanadyls such as tri(trimethylsiloxy)vanadyl and tri(triethylsiloxy)vanadyl, among which trialkoxyvanadyls and haloalkoxyvanadyls are preferably used.

In the process of this invention, these catalyst components are absorbed separately in finely granular ethylene polymer to prepare the catalyst. Any ethylene polymer containing no impurities functioning as catalyst poison can be utilized. Taking into consideration the situation that the catalyst components are absorbed, however, porous finely divided ethylene polymer is preferable and, usually, one having a particle size of 10–200 mesh and a bulk density of 0.1–0.3 is suitably employed.

Since the catalyst components of this invention are promptly deactivated by moisture, oxygen, etc., the finely granular ethylene polymer utilizable for absorption of them should be sufficiently dried.

Any desired method can be applied for absorbing the catalyst components in the finely granular ethylene polymer. For example, it is possible to effect direct absorption, depending on the catalyst components. Generally utilizable for this purpose is a process wherein the catalyst components are dissolved in or diluted with a hydrocarbon solvent having a low boiling point, such as petane, and absorbed in finely divided ethylene polymer and thereafter the hydrocarbon solvent is evaporated from the ethylene polymer or a process wherein a vapor of the catalyst components diluted with an inert gas is passed through finely divided ethylene polymer to effect deposit of the vapor thereon. The amount of the catalyst components to be absorbed in the finely granular ethylene polymer may vary in any desired ratio but is generally within the range of 0.01–10 mmols per gram of the ethylene polymer.

The proportion of the catalyst components varies according to the reaction conditions but is preferably within the range of 0.1–100, more preferably 1–50, in terms of Al/V (atomic ratio).

No particular limitation is necessary for the preparation of the catalyst from the finely granular ethylene polymer impregnated with the catalyst components. The finely granular ethylene polymer impregnated separately with the catalyst components may be mixed previously and introduced together into the reaction system or they may be introduced separately into the reaction system. Other components may be present in the reaction system.

The polymerization of olefins is carried out by using the catalyst thus obtained. In this invention, it is also possible to effect copolymerization of ethylene with an olefin other than ethylene, such as propylene, butene-1 or the like.

The polymerization reaction is carried out by polymerizing ethylene or a mixture of ethylene and another olefin in vapor phase. Either a fluidized bed or an agitation tank may be utilized as the reaction vessel but the use of a fluidized bed is preferable because of its ease in removing the heat of polymerization reaction. The polymerization reaction is carried out at a temperature of from room temperature to 110° C., preferably from 50° C. to 100° C. It is not desirable to carry out the polymerization at a temperature higher than said range for the reason that the resultant ethylene polymer adheres mutually or to the wall of the reactor. The polymerization reaction may be carried out under atmospheric pressure or superatmospheric pressure, preferably at least 10 atm.

In the present invention, hydrogen may be present in the reaction system to control the molecular weight and other characteristics of the resulting polymers.

The polymerization of olefins is performed in the manner as mentioned above. Since the catalyst of this invention is promptly deactivated by moisture, oxygen, etc. as described above, ethylene, hydrogen and the like which are to be supplied to the polymerization system should previously be refined sufficiently.

Ethylene polymer thus obtained is colorless and has a high bulk density and hence is suitable for use in molding. The use of the catalyst of this invention enables manufacture of more than 4000 grams of the polymer per gram of the vanadium compound, thus permitting omission of the step of removing the catalyst.

As is evident from the foregoing detailed explanations, when the polymerization of ethylene is carried out using the catalyst prepared according to the process of this invention by absorbing the catalyst components separately in finely divided inert ethylene polymer, polyethylene possessing excellent crystallinity and uniform molecular weight distribution can be obtained in granular form having a high bulk density. As the use of such improved catalyst brings about high production efficiency, the amount of the catalyst used can be minimized. Thus, there is additional merit in that no treatment is necessary for removal of the catalyst from the resulting polymer. When the polymerization of ethylene is carried out in accordance with the process of this invention, gaseous hydrogen functions effectively for controlling the molecular weight of the resulting polymer and, on the other hand, the formation of a low molecular weight polymer usually called "grease wax" is found very slight. The catalyst prepared in accordance with the process of this invention has a prolonged life in comparison with conventional catalyst systems. In addition, there is no fear of permitting the polymerization reaction to proceed too rapidly. In the process of this invention, the use of an inert liquid hydrocarbon is of course unnecessary. Therefore, the process of this invention permits the industrially advantageous polymerization of olefins and especially contributes to the polymerization of ethylene.

The following examples illustrate this invention but they are not intended to limit this invention.

EXAMPLE 1

Powdered polyethylene obtained by a conventional slurry polymerization method and freed from any catalyst was subjected to sieve treatment to recover a fraction of less than 16 mesh. The bulk density of this polyethylene was 0.1 g./cc. The powdery polyethylene was dried overnight at a temperature of 60° C. The dry powdery polyethylene thus obtained was impregnated in an inert gas atmosphere separately with a solution of triisobutoxyvanadyl VO(O-iso-$C_4H_9$)$_3$ in pentane and a solution of diethylaluminum monochloride Al($C_2H_5$)$_2$Cl in pentane. After impregnation, two groups of powdery polyethylene were treated in a stream of an inert gas to evaporate pentane therefrom. Powdery polyethylene containing the vanadium compound and powdery polyethylene containing the alkylaluminum compound thus obtained were used as the catalyst components.

An anchor-shaped stirrer was equipped in a 500 cc. glass autoclave in such manner that the wings of the stirrer scrape the inner wall of the autoclave. Into the autoclave was introduced refined nitrogen gas to replace the air occupying the inside space of the autoclave. Given amounts of the catalyst components were charged into the autoclave and then a mixture of gaseous ethylene with a given amount of hydrogen was introduced thereinto under pressure with slow agitation. During the polymerization reaction, gaseous ethylene was supplied every time the pressure of the autoclave was decreased, thereby maintaining the reaction pressure at a given pressure. The polymerization reaction was carried out for one hour in the above manner. The results obtained are shown in Table 1 below.

TABLE 1

| Vanadium component | | Aluminum component | | Al/V atomic ratio | Polymerization temperature, °C. | Polymerization pressure, kg./cm.² | H₂/C₂H₄ mol ratio |
|---|---|---|---|---|---|---|---|
| VO(O-iso-Bu)₃ mmol | Supporting polymer, g. | AlEt₂Cl mmol | Supporting polymer, g. | | | | |
| 0.1 | 2.5 | 4.0 | 2.5 | 40 | 40±3 | 3 | 0.15 |
| 0.05 | 1.0 | 2.0 | 2.5 | 40 | 40±3 | 5 | 0.22 |
| 0.03 | 0.5 | 2.0 | 2.0 | 67 | 36±2 | 5 | 0.13 |

| Amount of polymer formed, g. | Bulk density of polymer | Melt index of polymer | Catalyst efficiency g. EP/g. VO(O-iso-Bu)₃ | Polymerization rate g. EP/g. VO(O-iso-Bu)₃·hr. partial pressure of ethylene (atm.) |
|---|---|---|---|---|
| 20 | 0.28 | 3.2 | 700 | 200 |
| 24 | 0.28 | 0.9 | 1,600 | 320 |
| 11.6 | 0.24 | 0.3 | 1,500 | 280 |

REMARKS: The symbols "iso-Bu" and "Et" in the table stand for iso-butyl group and ethyl group, respectively. Similarly, EP stands for ethylene polymer.

An X-ray analysis of the resulting polyethylene products showed that they had a crystallinity of at least 90%.

EXAMPLE 2

The vapor phase polymerization of ethylene was carried out as described in Example 1, except that the vanadium compound and the alkylaluminum compound used therein were replaced by those tabulated below. The results obtained are shown in Table 2.

placed said catalyst components a nitrogen atmosphere. A gaseous mixture of ethylene and hydrogen was introduced into the autoclave while stirring the catalyst components and the polymerization was carried out at 40° C. for 60 minutes. An average gas composition of the ethylene/hydrogen mixture used was 0.36 in terms of H₂/C₂H₄ (mol ratio). 33.5 g. of uniformly granular polyethylene were obtained, which had a melt index of 0.35. In this reaction, the catalyst efficiency was 2,340.

TABLE 2

| Vanadium component | | | Aluminum component | | | Al/V atomic ratio | Polymerization temperature, °C. |
|---|---|---|---|---|---|---|---|
| Vanadium compound | Amount, mmol | Supporting EP, g. | Aluminum compound | Amount, mmol | Supporting EP, g. | | |
| VO(O-iso-Bu)₃ | 0.1 | 2.0 | AlEtCl₂ | 2.0 | 2.0 | 20 | 50 |
| VO(O-iso-Bu)₃ | 0.1 | 2.0 | AlEtCl₂ | 2.0 | 2.0 | 20 | 50 |
| VOCl(OEt)₂ | 0.1 | 2.0 | AlEt₂Cl | 2.0 | 2.0 | 20 | 80 |
| VO(OEt)₃ | 0.1 | 2.0 | AlEt₂Cl | 2.0 | 2.0 | 20 | 80 |
| VO(OSiMe₃)₃ | 0.05 | 2.0 | AlEt₂Cl | 2.0 | 2.0 | 40 | 80 |

| Polymerization pressure kg./cm.² | H₂/C₂H₄ mol ratio | Amount of polymer formed, g. | Bulk density of polymer | Melt index of polymer | Catalyst efficiency, g. EP/g. V compound | Polymerization rate, g. EP/g. V compound·hr. partial pressure of ethylene (atm.) |
|---|---|---|---|---|---|---|
| 5 | 2.0 | 7.6 | 0.20 | 0.2 | 266 | 160 |
| 5 | 3.0 | 5.4 | 0.21 | 0.9 | 187 | 150 |
| 5 | 0.2 | 25.6 | 0.34 | 0.3 | 1,330 | 320 |
| 5 | 0.16 | 23.7 | 0.32 | 3.0 | 1,420 | 330 |

EXAMPLE 3

0.05 millimol of triisobutoxyvanadyl VO(O-iso-Bu)₃ and 2 mmol of diethylaluminum monochloride were separately carried respectively on 2 g. of polyethylene having a bulk density of 0.1 and a particle size of 60–80 mesh which had been manufactured by a conventional slurry polymerization, to prepare the catalyst components.

In a 2 liter autoclave provided with a stirrer were

EXAMPLE 4

The polymerization reaction was carried out as described in Example 3, except that the amount of the catalyst components and the reaction conditions were changed as tabulated in Table 3. The results obtained are shown in Table 3.

TABLE 3

| Vanadium component | | Aluminum component | | Al/V atomic ratio | Polymerization | | | H₂/C₂H₄ mol ratio |
|---|---|---|---|---|---|---|---|---|
| VO(O-iso-Bu)₃, mmol | Supporting EP, g. | AlEt₂Cl mmol | Supporting EP, g. | | Temperature, °C. | Time, min. | Pressure, kg./cm.² | |
| 0.02 | 2.0 | 2.0 | 2.0 | 100 | 50 | 75 | 21 | 0.217 |
| 0.03 | 2.0 | 2.0 | 2.0 | 67 | 50 | 100 | 20 | 0.268 |
| 0.02 | 2.0 | 2.0 | 2.0 | 100 | 50 | 90 | 10 | 0.220 |
| 0.02 | 2.0 | 2.0 | 2.0 | 100 | 50 | 120 | 10 | 0.215 |

| | | Characteristics of the resulting polyethylene | | | | | |
|---|---|---|---|---|---|---|---|
| Yield of polymer, g. | Catalyst efficiency | Average mol. weight ×10⁻⁴ | Melt index[1] | Dependency of melt viscosity on pressure[2] | Density[3] | Tensile impact strength,[4] kg.cm./cm.³ | Modulus of elasticity[5] kg./cm.×10⁻³ | Bulk density of EP powder |
| 39.0 | 6,800 | 5.3 | 5.6 | 21 | 0.968 | 181 | 16.4 | 0.40 |
| 61.0 | 7,100 | 5.9 | 3.3 | 21 | 0.966 | 232 | 15.3 | 0.39 |
| 48.2 | 4,000 | | 5.3 | | 0.966 | | | 0.33 |
| 63.5 | 5,300 | | 5.0 | | 0.967 | | | 0.41 |

[1] Measured according to ASTM D-1238.
[2] The ratio of the amounts extruded out respectively at 10⁵ dyne/cm.² and 10⁶ dyne/cm.² of shearing stress in a melt-indexer at 190° C. A value of around 20 in this characteristic means that the distribution of molecular weight is narrow.
[3] Measured according to ASTM D-1248.
[4] Measured according to ASTM D-1822.
[5] Measured according to ASTM D-638.

EXAMPLE 5

A glass filter was fitted to the bottom of a glass tube having an inner diameter of 30 mm. and a length of 20 cm. so as to permit blowing gaseous ethylene into the tube from the bottom to the top. Into the fluidized-bed reactor were charged two groups of 1.5 g. of powdery polyethylene, one impregnated with 0.2 mmol of triisopropoxyvanadyl $VO(O-iso-C_3H_7)_3$ and the other impregnated with 0.4 mmol of diethylaluminum monochloride $Al(C_2H_5)_2Cl$, which had been prepared in a manner similar to that of Example 1. Ethylene was then introduced at ordinary temperature under atmospheric pressure into the tube and the polymerization reaction was carried out for 30 minutes. The powdery polyethylene in the reaction system gained about 3 g. in total weight. The bulk density of the whole polyethylene in the reaction system was increased to 0.30 while the charged powdery polyethylene had a bulk density of 0.21.

EXAMPLE 6

In the presence of the same catalyst as used in Example 3, the vapor phase polymerization was carried out under the same reaction conditions using a gaseous mixture of 95 mol percent ethylene and 5 mol percent propylene. Ethylene-propylene copolymer containing 6% by weight of propylene was obtained. In this reaction, the catalyst efficiency was 2,100.

COMPARATIVE EXAMPLE 1

A comparative test was made between the process of this invention and a conventional liquid phase process, using the same amounts of triisobutoxyvanadyl $$VO(O-iso-C_4H_9)_3$$

and diethylaluminum monochloride $Al(C_2H_5)_2Cl$. In one test run, both catalyst components were used in absorbed state separately in polyethylene. In the other test run, both catalyst components were in solution in the presence of an inert hydrocarbon diluent. Other polymerization conditions were the same in both test runs and the polymerization reaction was carried out using ethylene. The results obtained are shown in Table 4 below.

shown in Table 5 below, using the catalyst prepared as described in Example 1 and a catalyst prepared by mixing together the vanadium compound, alkylaluminum compound and ethylene polymer. The results obtained are shown in Table 5 below.

TABLE 5

| | I | II |
|---|---|---|
| Composition of catalyst: | | |
| $VO(OC_4H_9)_3$ (mmol) | 0.1/3 g. polyethylene | 0.1 |
| $Al(C_2H_5)_2Cl$ (mmol) | 2.0/3 g. polyethylene | 2.0 |
| Polymerization temperature (° C.) | 30 | 4 g. polyethylene 30 |
| Polymerization pressure | Normal pressure | Normal pressure |
| Polymerization time (hr.) | 1 | ½ |
| Durability of absorption of ethylene | Durable | Stop |
| Gain in weight of the polymer (g.) | 5.7 | 1.4 |
| Adhesion to the wall of reactor | Not observed | Observed |

The tabulated results clearly show that when the catalyst components are absorbed in accordance with the process of this invention separately in polyethylene, excellent and remarkable effects are obtained in durability of absorption of ethylene and the amount of polyethylene formed, and adhesion to the wall of reactor is not observed in contrast to the case where the catalyst components are together adsorbed in polyethylene. These facts evidently show that the desired purpose is attained only by absorbing the catalyst components separately in finely divided polyethylene.

What is claimed is:

1. A process for the vapor phase polymerization of ethylene or a mixture of ethylene and other copolymerizable α-olefins in an amount up to 10% by weight, said process comprising polymerizing ethylene or a mixture of ethylene and up to 10% by weight of other copolymerizable α-olefins at a temperature of 0–110° C. under atmospheric or superatmospheric pressure in the absence of a liquid hydrocarbon diluent, and in the presence of a catalyst consisting essentially of a mixture of two catalyst components, the first being finely granular ethylene polymer impregnated with an organoaluminum compound of the general formula $AlR_{3-n}X_n$ wherein R is an alkyl group, X may be the same or different and is a halogen atom or an alkoxy or trialkylsiloxy group and $n$ is a number of 0–2, and the second being finely granular ethylene polymer impregnated with a vanadium compound of the general formula $VOY_3$ wherein Y may be the same or different and is a halogen atom, an alkoxy or trialkylsiloxy group, with the proviso that at least one Y is an alkoxy group or trialkylsiloxy group.

2. A process for the vapor phase polymerization of ethylene or a mixture of ethylene and butene-1 or propylene in an amount up to 10% by weight, said process comprising polymerizing ethylene or a mixture of ethylene and up to 10% by weight of butene-1 or propylene in the

TABLE 4

| | Conventional process | Present process |
|---|---|---|
| Inert hydrocarbon diluent | Yes | No |
| Catalyst: | | |
| $VO(O-iso-Bu)_3$ | Added as solution | Absorbed in polyethylene |
| $AlEt_2Cl$ | | |
| Polymerization temperature (° C.) | 90 | 90 |
| Polymerization pressure (kg./cm.²) | 20 | 20 |
| Duration time for absorption of ethylene (hr.) | ½ | 1–2 |
| Bulk density of the resulting polyethylene (g./cc.) | 0.08–0.15 | 0.3–0.4 |

The tabulated results obviously show that since the catalyst life in the present process is longer than that in the conventional process, the duration time for absorption of ethylene is longer in the present process. Further, the bulk density of the resulting polyethylene in the present process is substantially higher than in the conventional process.

COMPARATIVE EXAMPLE 2

A comparative test was made carrying out the polymerization reaction of ethylene under the conditions as presence of a catalyst consisting essentially of a mixture of two catalyst components, the first being finely granular ethylene polymer impregnated with an organoaluminum compound of the general formula $AlR_{3-n}X_n$ wherein R is an alkyl group, X may be the same or different and is a halogen atom or an alkoxy group and $n$ is a number of 0–2, and the second being finely granular ethylene polymer impregnated with a vanadium compound of the general formula $VOY_3$ wherein Y may be the same or different and is an alkoxy or trialkylsiloxy group, said polymerizing being effected at a temperature of 0–110° C. under a superatmospheric pressure above 10 atm. in the presence of hydrogen but in the absence of a liquid hydrocarbon diluent, to prepare at least 4,000 g. of polymeric product per gram of $VOY_3$ thereby avoiding the necessity for eliminating the catalyst from the polymeric product.

3. A process as claimed in claim 2 wherein the finely granular ethylene polymer which is impregnated with the catalyst components has a particle size of 10–200 mesh and a bulk density of 0.1–0.3 g./cc.

4. A process as claimed in claim 2 wherein the amount of the catalyst components for impregnation is 0.01–10 millimols per gram of the granular ethylene polymer.

5. A process for the vapor phase polymerization of ethylene or a mixture of ethylene and butene-1 or propylene in an amount up to 10% by weight, said process comprising polymerizing ethylene or a mixture of ethylene and up to 10% by weight of butene-1 or propylene in the presence of a catalyst consisting essentially of a mixture of two catalyst components, the first being finely granular ethylene polymer having a particle size of 10–100 mesh and a bulk density of 0.1–0.3 g./cc. impregnated with an organoaluminum compound of the general formula $AlR_{3-n}X_n$ wherein R is an alkyl group, X may be the same or different and is a halogen atom or an alkoxy group and $n$ is a number of 0–2, and the second being finely granular ethylene polymer having a particle size of 10–100 mesh and a bulk density of 0.1–0.3 g./cc. impregnated with a hydrocarbon soluble vanadium compound of the general formula $VOY_3$ wherein Y may be the same or different and is a halogen atom or an alkoxy or trialkylsiloxy group, with the proviso that at least one Y is an alkoxy group or trialkylsiloxy group, said polymerizing being effected at a temperature of 30–100° C. under atmospheric or superatmospheric pressure in the presence of hydrogen but in the absence of a liquid diluent while maintaining the catalyst in a fluidized state.

References Cited

UNITED STATES PATENTS

| | | | |
|---|---|---|---|
| 2,962,451 | 11/1960 | Schreyer | 252—429 |
| 3,152,088 | 10/1964 | Sandri et al. | 260—94.9 |
| 3,298,792 | 1/1967 | Drusco | 23—284 |
| 3,462,399 | 8/1969 | Matthews | 260—80.78 |

FOREIGN PATENTS 851,111  10/1960  Great Britain.

JOSEPH L. SCHOFER, Primary Examiner

E. J. SMITH, Assistant Examiner

U.S. Cl. X.R.

252—429 B, 431 R; 260—94.9 C

UNITED STATES PATENT OFFICE
CERTIFICATE OF CORRECTION

Patent No. 3,642,748              Dated February 15, 1972

Inventor(s) Koichiro Iwasaki et al

It is certified that error appears in the above-identified patent and that said Letters Patent are hereby corrected as shown below:

In the heading to the printed specification, between lines 9 and 10 insert -- claims priority, application Japan, Dec. 16, 1968, No. 92181/68 --.

Signed and sealed this 21st day of November 1972.

(SEAL)
Attest:

EDWARD M. FLETCHER, JR.          ROBERT GOTTSCHALK
Attesting Officer                Commissioner of Patents